United States Patent
Lee et al.

(10) Patent No.: US 10,582,161 B2
(45) Date of Patent: Mar. 3, 2020

(54) MONITORING APPARATUS AND CONTROLLING METHOD THEREFOR

(71) Applicant: LG ELECTRONICS INC., Seoul (KR)

(72) Inventors: Younkyung Lee, Seoul (KR); Seeeun Choi, Seoul (KR); Jihoon Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 219 days.

(21) Appl. No.: 15/522,053

(22) PCT Filed: Oct. 27, 2014

(86) PCT No.: PCT/KR2014/010135
§ 371 (c)(1),
(2) Date: Apr. 26, 2017

(87) PCT Pub. No.: WO2016/068350
PCT Pub. Date: May 6, 2016

(65) Prior Publication Data
US 2017/0318265 A1    Nov. 2, 2017

(51) Int. Cl.
*H04N 7/18* (2006.01)
*H04N 5/232* (2006.01)

(52) U.S. Cl.
CPC ......... *H04N 7/181* (2013.01); *H04N 5/23241* (2013.01); *H04N 5/23293* (2013.01)

(58) Field of Classification Search
CPC . H04N 5/23206; H04N 7/181; H04N 5/23245
See application file for complete search history.

(56) References Cited

U.S. PATENT DOCUMENTS

2007/0103548 A1* 5/2007 Carter ................. H04M 11/025
                                                            348/143
2008/0266394 A1* 10/2008 Groenenboom ..... G08B 13/196
                                                            348/143
(Continued)

FOREIGN PATENT DOCUMENTS

KR    20070115354    12/2007
KR    20110077874    7/2011
(Continued)

OTHER PUBLICATIONS

PCT International Application No. PCT/KR2014/010135, International Search Report dated Jul. 13, 2015, 4 pages.

*Primary Examiner* — Mainul Hasan
(74) *Attorney, Agent, or Firm* — Lee, Hong, Degerman, Kang & Waimey

(57) ABSTRACT

The present invention relates to a monitoring apparatus and a controlling method therefor. The present invention comprises: a device body mounted in any one side of an object having a front side and a back side; at least two cameras, equipped in the device, for receiving images of the direction in which the front side of the object is directed and the direction in which the back side of the object is directed; a sensor unit for sensing the object and the situation of the object's surroundings; and a control unit for driving at least one of the cameras in an imaging standby mode when a target object approaches within a predetermined distance from the object, switching the at least one camera to an imaging activation mode when a preset situation occurs as a result of the sensing of the sensor unit, and performing functions corresponding to a currently occurring situation by using at least one of the images received from the at least one camera and sensing results from the sensor unit.

20 Claims, 10 Drawing Sheets

(56) References Cited

U.S. PATENT DOCUMENTS

| | | | |
|---|---|---|---|
| 2011/0292213 A1* | 12/2011 | Lacey | H04N 7/181 |
| | | | 348/153 |
| 2013/0057695 A1 | 3/2013 | Huisking et al. | |
| 2015/0029335 A1* | 1/2015 | Kasmir | H04N 7/186 |
| | | | 348/143 |
| 2015/0061859 A1* | 3/2015 | Matsuoka | G08B 27/00 |
| | | | 340/501 |

FOREIGN PATENT DOCUMENTS

| | | |
|---|---|---|
| KR | 20120114489 | 10/2012 |
| KR | 101425598 | 8/2014 |

\* cited by examiner (a)

(b)

(a)

(b)

(a)

(b)

US 10,582,161 B2

MONITORING APPARATUS AND CONTROLLING METHOD THEREFOR

CROSS-REFERENCE TO RELATED APPLICATIONS

This application is the National Stage filing under 35 U.S.C. 371 of International Application No. PCT/KR2014/010135, filed on Oct. 27, 2014, the contents of which are all hereby incorporated by reference herein in its entirety.

TECHNICAL FIELD

The present invention relates to a monitoring apparatus and a control method thereof.

BACKGROUND ART

Due to crimes and accidents which are continuously increasing at present, the necessity of monitoring devices such as monitoring cameras is increasing day to day. This is because when illegal actions such as theft or accidents such as traffic accidents occur, pieces of information collected by the monitoring devices may include important evidences associated with the illegal actions or the accidents. For this reason, the monitoring devices cause a problem of decreasing a strong illegal action restriction effect or an occurrence rate of accidents such as traffic accidents.

Therefore, the demand of the monitoring devices is continuously increasing. However, performances of the monitoring devices differ depending on functions. For example, unlike a monitoring apparatus such as a simple monitoring camera which provides only a function of photographing a low-quality image, a high-performance monitoring apparatus can automatically monitor a specific zone or an approaching object and can photograph a high-quality image focusing on the approaching object, and moreover, when an abnormal situation occurs, the high-performance monitoring apparatus may include functions of transferring the occurrence of the abnormal situation to a user.

The cost of the monitoring devices is changed depending on functions provided thereby. Also, high-performance monitoring devices need the very high purchase price. Therefore, research for providing monitoring devices which provide a high monitoring performance is being done.

DISCLOSURE OF THE INVENTION

Therefore, an object of the present invention is to provide a monitoring apparatus and a control method thereof, which provide various monitoring functions to a user at low cost.

Another object of the present invention is to provide a monitoring apparatus and a control method thereof, which use a mobile terminal such as a separate smartphone and provide a high monitoring performance to a user even without user's purchasing a separate monitoring apparatus.

To achieve these and other advantages and in accordance with the purpose of the present invention, as embodied and broadly described herein, there is provided a monitoring apparatus including a device body mounted on one surface of an object including a front surface and a rear surface, at least two cameras included in the device, the at least one cameras receiving an image corresponding to a direction toward the front surface of the object and an image corresponding to a direction toward the rear surface of the object, a sensing unit sensing the object and a situation around the object, and a control unit driving at least one of the cameras in a photographing standby mode when there is a target object approaching to within a certain distance from the object, changing the at least one camera to a photographing activation mode when a predetermined situation occurs as a sensing result of the sensing unit, and performing a function corresponding to a current occurring situation by using at least one of an image received from the at least one camera and the sensing result of the sensing unit.

In an embodiment, the control unit transmits the at least one of an image received from the at least one camera and the sensing result of the sensing unit to predetermined another terminal and performs a function based on a control signal transmitted from the other terminal In an embodiment, the function based on the control signal is a function of outputting at least one, based on the control signal, of a plurality of pieces of audio data stored in the monitoring apparatus.

In an embodiment, the control unit selects at least some of the stored plurality of pieces of audio data according to the control signal and simultaneously outputs the selected at least some pieces of audio data.

In an embodiment, the control unit outputs the at least one piece of audio data in a stereo form by using a plurality of sound output units included in the monitoring apparatus.

In an embodiment, the predetermined other terminal receives a voice signal of a user, and the control signal is a signal for controlling the monitoring apparatus to output the voice signal of the user input through the other terminal.

In an embodiment, when there are target objects approaching to within a certain distance from all of the front surface and the rear surface of the object, the control unit transmits images, sensed by all of the at least two cameras, to the other terminal.

In an embodiment, at least one other monitoring apparatus is located near the monitoring apparatus, and when the predetermined situation occurs, the control unit further collects information sensed from the other monitoring apparatus and transmits the collected information to the other terminal.

In an embodiment, the image received from the at least one camera and the sensing result are transmitted to the other terminal, and then, when the control signal is not received from the other terminal within a predetermined time, the control unit automatically performs a function corresponding to the occurred situation.

In an embodiment, the automatically performed function is a function of outputting at least one of pieces of stored audio data or a function of transmitting information including the image received from the at least one camera and the sensing result, based on a predetermined contact address.

In an embodiment, the control unit recognizes whether a user goes out, based on a position of the other terminal, and when it is recognized that the user goes out, the control unit displays information about a state of at least one connectable home appliance through a display unit included in the monitoring apparatus.

In an embodiment, the control unit controls a power state of the at least one home appliance of which the state is displayed in the display unit, based on a user input applied to the display unit.

In an embodiment, when the sensing result of the sensing unit and at least one of noise, vibration, and an impact equal to or more than a predetermined level are sensed from the object and near the object, the control unit determines occurrence of the predetermined situation.

In an embodiment, the control unit transmits information, associated with the sensed at least one of the noise, the impact, and the vibration, to predetermined at least one other terminal along with the image received from the at least one camera.

In an embodiment, when information received from the monitoring apparatus includes the information associated with the sensed at least one of the noise, the impact, and the vibration, the other terminal outputs at least one of a sound signal and vibration corresponding to at least one of the noise, the impact, and the vibration along with the image received from the at least one camera.

In an embodiment, when the target object is sensed within a predetermined distance from the object for a predetermined time or more as the sensing result of the sensing unit, the control unit determines occurrence of the predetermined situation.

In an embodiment, the monitoring apparatus further includes a display unit including image information, the display unit being equipped in the object and being identifiably mounted on one of the front surface and the rear surface of the object, wherein the control unit receives an image, corresponding to a direction toward a surface opposite to a surface of the object on which the monitoring apparatus is mounted, and displays the received image in the display unit.

In an embodiment, when there is the target object approaching to within a certain distance from one of the front surface and the rear surface of the object as the sensing result of the sensing unit, the control unit changes a camera, receiving an image corresponding to a direction in which the target object is located, among the cameras to a photographing standby mode, and when the predetermine situation occurs, the control unit stores an image received from the camera changed to the photographing standby mode.

In an embodiment, the monitoring apparatus is one of a personal digital assistant (PDA), a portable multimedia player (PMP), a navigation device, and a tablet personal computer (PC).

To achieve these and other advantages and in accordance with the purpose of the present invention, in a method of controlling a monitoring apparatus which is mounted on a front surface or a rear surface of an object and senses the object and a situation around the object, the method of controlling a monitoring apparatus according to an embodiment of the present invention includes sensing whether there is a target object approaching to within a predetermined distance from at least one of the front surface and the rear surface of the object, changing at least one of at least two cameras for receiving an image, corresponding to a direction toward the front surface or the rear surface of the object, to a photographing standby mode according to the sensing result, determining whether a predetermined situation occurs, based on a result obtained by sensing the object and the situation around the object, and performing a function corresponding to a current occurring situation by using at least one of an image received from the at least one camera and the result obtained by sensing the object and the situation around the object, based on the determination result, wherein the predetermined situation is a situation where noise equal to or more than a predetermined level occurs, a situation where an impact or vibration which is sensed from the object and is equal to or more than a predetermined level occurs, or a situation where the target object is sensed within a predetermined distance from the object for a predetermined time or more.

Advantageous Effect

Effects of a monitoring apparatus and a control method thereof according to the present invention will be described below.

According to at least one of embodiments of the present invention, the present invention enables a user to perform a function of a monitoring apparatus by using a mobile terminal such as a smartphone which is not used by the user, and thus, since the user does not need a separate monitoring apparatus, the present invention enable the user to get a high-performance monitoring service at low cost.

According to at least one of embodiments of the present invention, by using a mobile terminal such as a smartphone, the present invention can provide a user with a monitoring service using various functions of the mobile terminal.

MODES FOR CARRYING OUT THE PREFERRED EMBODIMENTS

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

In the present specification below, an example a user uses an extra smartphone currently unused as a monitoring apparatus will be described. However, the present invention is not limited thereto, and various devices such as personal digital assistants (PDAs), portable multimedia players (PMPs), navigation devices, and tablet personal computers (PCs) may be used. Also, in a case where there is a conventional monitoring apparatus, the monitoring apparatus may operate according to an operation process of the present invention described below in the present specification, and in this case, the present invention may be applied to a case using the conventional monitoring apparatus.

Figure 1A:
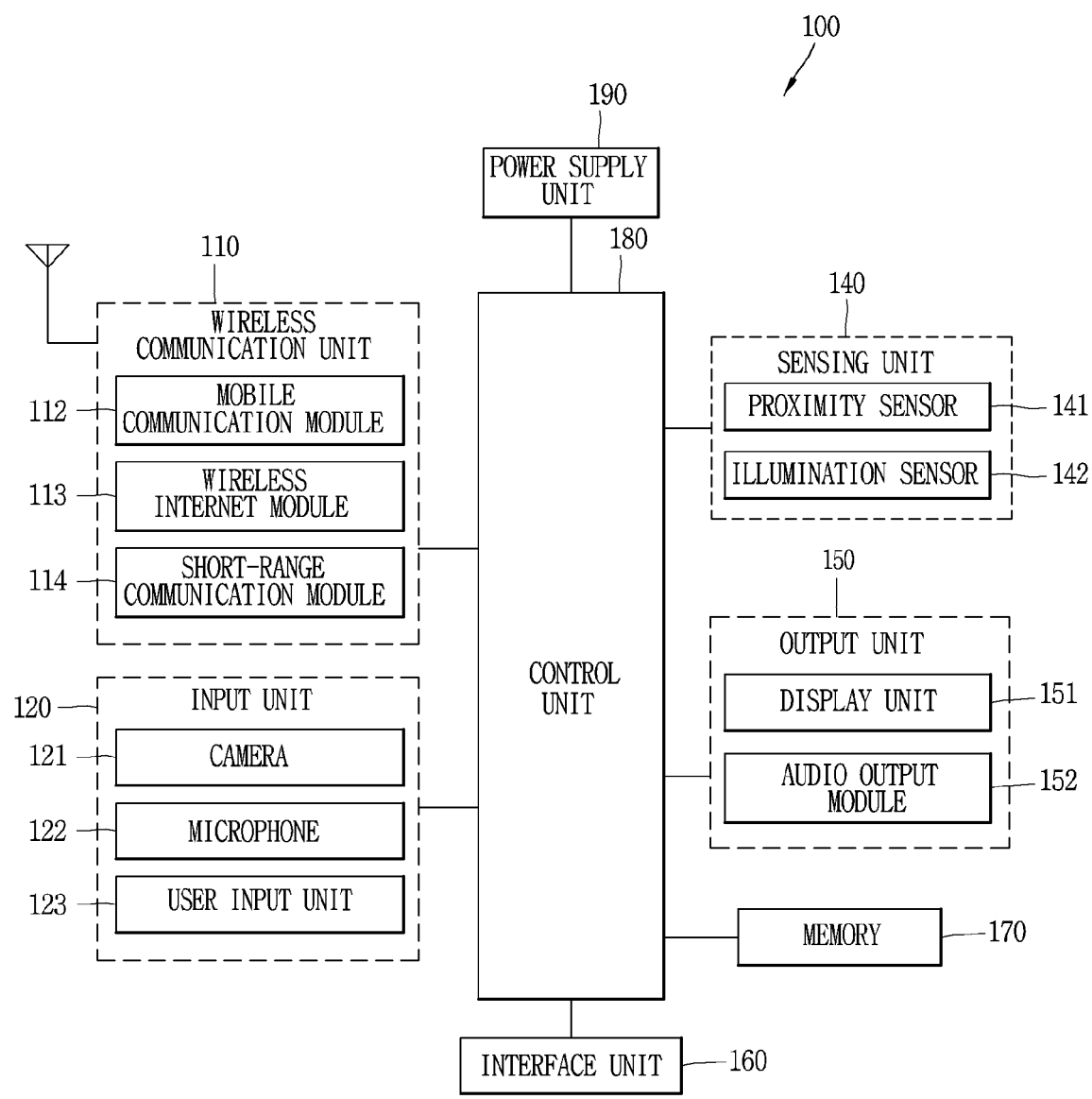
FIG. 1A is a block diagram for describing a monitoring apparatus according to the present invention.
Figure 1B:
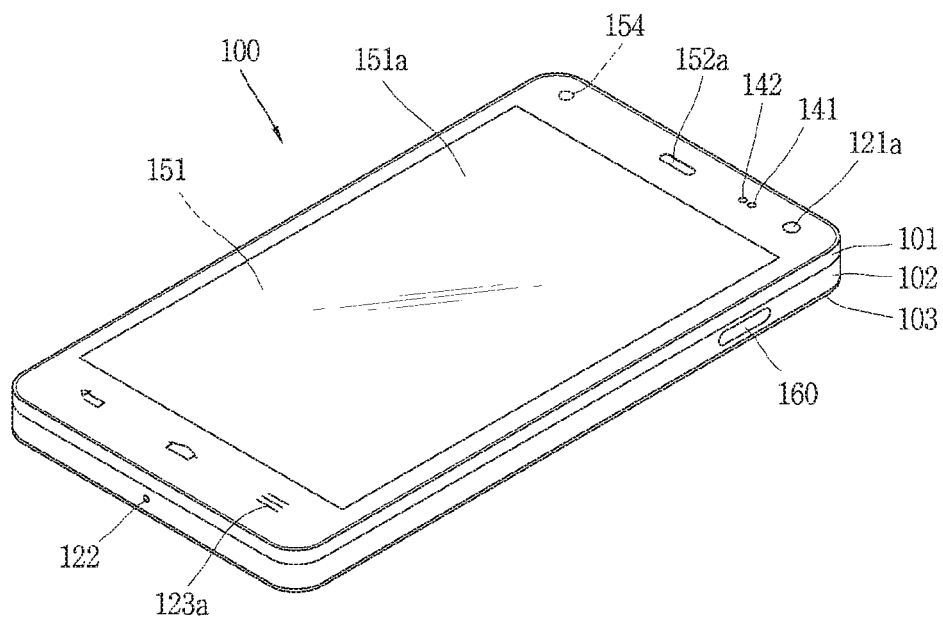
FIGS. 1B and 1C are conceptual diagrams when an embodiment of a monitoring apparatus according to the present invention is seen in different directions.
Figure 1C:
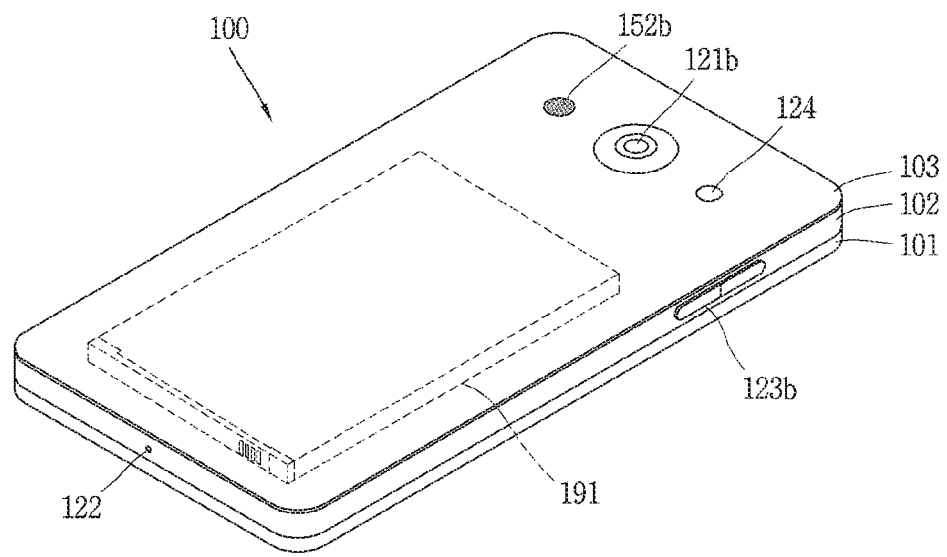

Referring to FIGS. 1A to 1C, FIG. 1A is a block diagram for describing a monitoring device 100 according to the present invention, and FIGS. 1B and 1C are conceptual diagrams when an embodiment of the monitoring device 100 according to the present invention is seen in different directions.

The monitoring device 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components of FIG. 1A is not a requirement, and that greater or fewer components may alternatively be implemented.

The wireless communication unit 110 typically includes one or more modules which permit communications such as wireless communications between the monitoring device 100 and a wireless communication system, communications between the monitoring device 100 and another mobile terminal, communications between the monitoring device 100 and an external server. Further, the wireless communication unit 110 typically includes one or more modules which connect the monitoring device 100 to one or more networks.

To facilitate such communications, the wireless communication unit 110 includes one or more of a mobile communication module 112, a wireless Internet module 113, and a short-range communication module 114.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the monitoring device 100. The wireless Internet module 113 may transmit and/or receive wireless signals via communication networks according to wireless Internet technologies, e.g., Wireless LAN (WLAN), Wireless-Fidelity (Wi-Fi), Wireless Fidelity (Wi-Fi) Direct, Wireless Broadband (WiBro), etc.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), Wireless-Fidelity (Wi-Fi), and the like. The short-range communication module 114 in general supports wireless communications between the monitoring device 100 and a wireless communication system, communications between the monitoring device 100 and another monitoring device 100.

The input unit 120 may include an image input unit such as a camera 121 for inputting an image signal, a microphone 122 or an audio input unit for inputting an audio signal, and a user input unit 123 (for example, a touch key, a mechanical key, etc.) for receiving information from a user. Sound data or image data collected by the input unit 120 may be analyzed and may be used for a service associated with various monitoring functions.

The camera 121 may be provided in plurality, and the plurality of cameras may be provided to photograph different surfaces (for example, a front surface and a rear surface) of an object equipped with the monitoring device 100. The camera 121 may process an image frame such as a still image or a moving image obtained by an image sensor in a video call mode or a photographing mode. The processed image frame may be displayed by the display unit 151 or may be stored in the memory 170. The cameras 121 may be arranged in a type including a plurality of lenses to form a matrix structure, and through the matrix structure, the monitoring device 100 may receive a plurality of pieces of image information having various angles or focuses. Also, the cameras 121 may be arranged in a stereo structure to obtain a left image and a right image for realizing a stereoscopic image.

The microphone 122 may process an external sound signal into electrical voice data. The processed voice data may be variously used depending on a monitoring service provided by the monitoring device 100.

The sensing unit 140 may include one or more sensors for sensing an object equipped with the monitoring device 100 or situation around the object. For example, the sensing unit 140 may include at least one of a proximity sensor 141, an illumination sensor 142, a touch sensor, an acceleration sensor, a magnetic sensor, an RGB sensor, an infrared sensor, an ultrasonic sensor, an optical sensor (for example, a camera (see 121)), a microphone (see 122), a battery gauge, and an environment sensor (for example, a barometer, a hygrometer, a thermometer, a radiation sensing sensor, a heat sensing sensor, a gas sensing sensor, etc.). The monitoring device 100 disclosed in the present specification may combine pieces of information sensed by two or more of the sensors and may use the combined information for various monitoring services.

When an approaching thing or person (hereinafter referred to as a target object) is within a certain distance from an object equipped with the monitoring device 100, the control unit 180 may sense the target object. For example, the control unit 180 may sense a change in illumination which occurs when the target object approaches, or may sense the presence of an approaching target object by using an ultrasonic sensor or an infrared sensor. Alternatively, the control unit 180 may sense an approach of the target object according to a comparison result obtained by comparing images which are received through the camera 121 at a predetermined time period.

The control unit 180 may sense a situation which occurs in association with the object. For example, when noise (for example, a sound knocking the object like doorbell or knock) more than a predetermined level occurs, the control unit 180 may sense the noise, based on noise which occurs in the object or around the object. Alternatively, the control unit 180 may sense vibration or an impact occurring in the object by using a touch sensor included in a body of the monitoring device 100.

The output unit 150 may include at least one of the display unit 151 and the sound output unit 152.

The display unit 151 may display various images received through the camera 121 and pieces of information associated with various peripheral devices connectable to the monitoring device 100. For example, the display unit 151 may display an image received from a camera which is installed to face a specific surface (for example, a rear surface) of the object, and may display information such as operation states of various indoor electronic devices such as a microwave oven or a television (TV). Alternatively, when there is another monitoring apparatus around the monitoring device 100, an image received from the other monitoring apparatus may be displayed by the display unit 151.

The sound output unit 152 may output various pieces of audio data received from the wireless communication unit 110 or stored in the memory 170. For example, the sound output unit 152 according to an embodiment of the present invention may output various pieces of audio data associated with a monitoring service, which is provided like living noise or previously recorded voices of persons, according to a selection of a user or a control signal transmitted from a mobile terminal of the user.

The memory 170 may store data for supporting various functions of the monitoring device 100. The memory 170 may store a plurality of application programs (or applications) executed by the monitoring device 100 and commands and pieces of data for an operation of the monitoring device 100. At least some of the application programs may be downloaded from an external server through wireless communication. Also, at least some of the application programs may be included in the monitoring device 100 when the monitoring device 100 is released, for a basic function (for example, an image photographing function, a record function, etc.) of the monitoring device 100. The application programs may be stored in the memory 170, installed in the monitoring device 100, and driven by the control unit 180 to perform an operation (or a function) of the mobile terminal.

The control unit 180 may generally control an overall operation of the monitoring device 100, in addition to an operation associated with the application programs. The control unit 180 may process signal, data, and information input or output through the above-described elements or may drive the application programs stored in the memory 170, thereby providing or processing information or functions appropriate for providing a monitoring service.

Moreover, the control unit 180 may control at least some of the elements described above with reference to FIG. 1A, for driving the stored application programs. Furthermore, the control unit 180 may combine and operate two or more of the elements included in the monitoring device 100, for driving of the application programs.

The power supply 190 may receive external power or internal power to supply power to each of the elements included in the monitoring device 100 according to control by the control unit 180. The power supply 190 may include a battery, and the battery may be an embedded battery or a replaceable battery.

Hereinafter, various embodiments may be implemented in a recording medium readable by a computer or a device similar thereto by using, for example, software, hardware, or a combination thereof.

Hereinafter, the monitoring apparatus according to an embodiment of the present invention described above with reference to FIG. 1A, a monitoring apparatus where elements of the monitoring apparatus are provided, or a structure thereof will be described with reference to FIGS. 1B and 1C.

Referring to FIGS. 1B and 1C, the disclosed monitoring device 100 may include a case (for example, a frame, a housing, a cover, or the like) configuring an external appearance. As illustrated, the monitoring device 100 may include a front case 101 and a rear case 102. Also, the monitoring device 100 may include a display unit 151, first and second sound output units 152a and 152b, a proximity sensor 141, an illumination sensor 142, a light output unit 154, first and second cameras 121a and 121b, first and second manipulation units 123a and 123b, a microphone 122, and an interface 160.

As seen in FIG. 1B, the display unit 151 may be disposed on a front surface of a body of the monitoring device 100 and may display information. As illustrated, a window 151a of the display unit 151 may be mounted on the front case 101 and may configure the front surface of the body of the monitoring device 100 along with the front case 101. Also, the first sound output unit 152a and the first camera 121a may be disposed on the front surface of the monitoring device 100.

As seen in FIG. 1C, the second camera 121b may be disposed on a rear surface of the body of the monitoring device 100. In this case, the second camera 121b may substantially have a photographing direction opposite to that of the first camera 121a.

A flash 124 may be disposed adjacent to the second camera 121b. In a case of photographing a subject with the second camera 121b, the flash 124 may irradiate light onto the subject, based on peripheral illumination.

The second sound output unit 152b may be disposed on the rear surface of the monitoring device 100. The second sound output unit 152b may realize a stereo function along with the first sound output unit 152a.

At least one of the first and second cameras 121a and 121b may include a plurality of lenses which are arranged along at least one line. The plurality of lenses may be arranged in a matrix type. Such a camera may be referred to as an array camera. In a case where at least one of the first and second cameras 121a and 121b is configured with an array camera, the camera may capture an image in various manners by using the plurality of lenses, thereby obtaining an image having better quality.

Figure 2A:
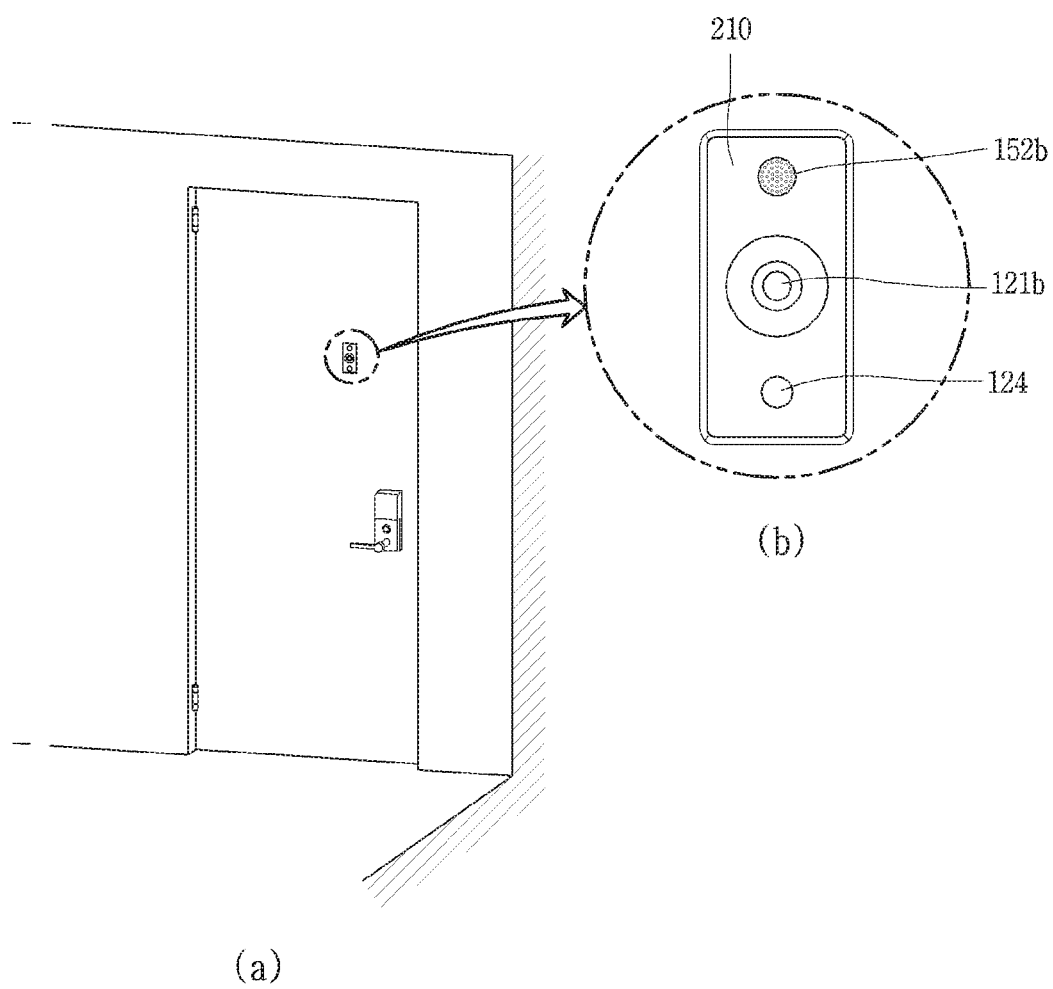
FIGS. 2A and 2B are conceptual diagrams illustrating an example where a monitoring apparatus according to the present invention is equipped in a specific object.
Figure 2B:
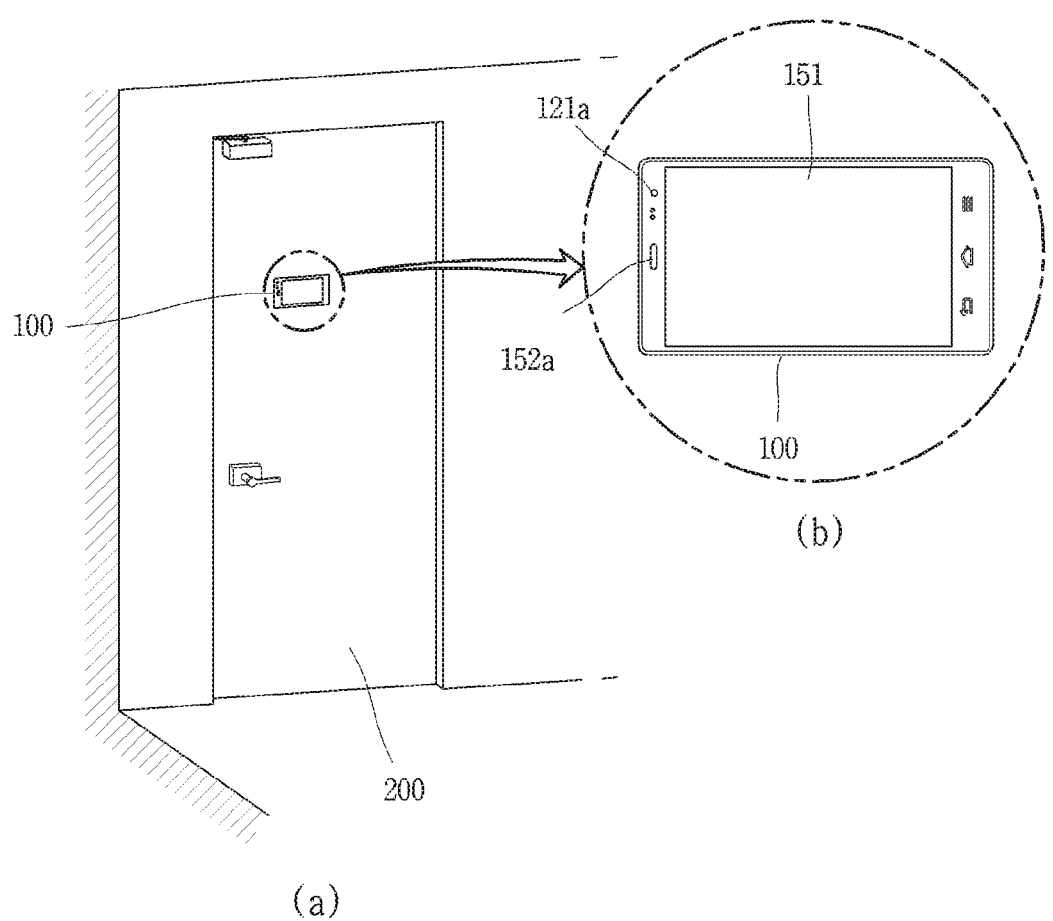

FIGS. 2A and 2B are conceptual diagrams illustrating an example where a monitoring apparatus according to the present invention is equipped in a specific object.

FIGS. 2A and 2B are for describing an example where an object equipped with the monitoring device 100 according to an embodiment of the present invention is a door. In the following description of the present specification, an example where an object equipped with the monitoring device 100 according to an embodiment of the present invention is a door as in FIGS. 2A and 2B will be described. However, this is merely an example for helping convenience of description of the present invention, and the present invention is not limited thereto. That is, an object equipped with the monitoring device 100 according to an embodiment of the present invention may be a structure, such as a wall, and various objects, in addition to a door. The monitoring device 100 according to an embodiment of the present invention may be variously used for monitoring all of internal and external situations in a boundary of a space where the inside is disconnected from the outside like a room, a case, a fishbowl, and a cage.

To provide description with reference to FIGS. 2A and 2B, FIG. 2A illustrates a rear surface of an object 200 equipped with the monitoring device 100 according to an embodiment of the present invention, and FIG. 2B illustrates a front surface of the object 200 equipped with the monitoring device 100 according to an embodiment of the present invention. In the following description, the front surface of the object may denote an indoor place, and the rear surface of the object may denote an outdoor place.

To provide description with reference to FIG. 2A, first, as illustrated in FIGS. 2A and 2B, the monitoring device 100 according to an embodiment of the present invention may be equipped in the object 200 so that the second sound output unit 152b, the second camera 121b, and the flash 124 are exposed to the rear surface of the object 200 through a groove 210. Therefore, the second camera 121b provided on the rear surface of the monitoring device 100 according to an embodiment of the present invention may receive an image of a rear surface of the object 200, and depending on the case, the flash 124 may emit light to irradiate the light onto the rear surface of the object 200. Also, pre-stored audio data or voice data received from a mobile terminal of a user may be output through the second sound output unit 152b according to control by the user.

On the other hand, as illustrated in FIG. 2B, the monitoring device 100 according to an embodiment of the present invention may be mounted on a front surface of the object 200 in a type where the display unit 151 is exposed. In this case, the display unit 151 may display an image of the rear surface of the object 200 received through the camera 121b. Therefore, a person located in the front of the object 200 (i.e., an indoor place) may check the rear surface of the object (i.e., an outdoor situation) through the display unit 151.

In addition, the monitoring device 100 according to an embodiment of the present invention may receive an image in a direction toward the front surface of the object 200 through the first camera 121a provided on the front surface. Also, the monitoring device 100 according to an embodiment of the present invention may store images, received through the first camera 121a or the second camera 121b, in the memory 170 or may transmit the images to another predetermined device in a video call form based on push notification or call transmission. For example, the other predetermined device may be a mobile terminal of a user, and in this case, the user may be provided with an image received from the first camera 121a and/or the second camera 121b by connecting the push notification or a call received from the monitoring device 100.

The monitoring device 100 according to an embodiment of the present invention may sense various pieces of information associated with the object, in addition to the images received through the first camera 121a and the second camera 121b. For example, by using the sensors of the sensing unit 140, the control unit 180 of the monitoring device 100 according to an embodiment of the present invention may sense whether there is an object approaching to a certain distance or more from the front surface and/or the rear surface of the object 200. Alternatively, the control unit 180 may sense noise and an impact or vibration occurring around the object 200, based on a result obtained through sensing by the sensors. Also, the control unit 180 may transmit information, obtained by sensing the object and/or situations around the object, and at least one of the images, received from the first camera 121a and the second camera 121b, to the mobile terminal of the user through the push notification or in a video call form based on call transmission or in the form of messages.

In this manner, when a result obtained by sensing the object and/or situations around the object is transmitted to a mobile terminal 300 of the user, the control unit 180 may perform a specific operation according to a control signal transmitted from the mobile terminal 300. For example, the control unit 180 may output audio data, transmitted from the mobile terminal 300, through the second sound output unit 152b, or may allow the specific operation to be performed according to the control signal transmitted from the mobile terminal 300.

Figure 3:
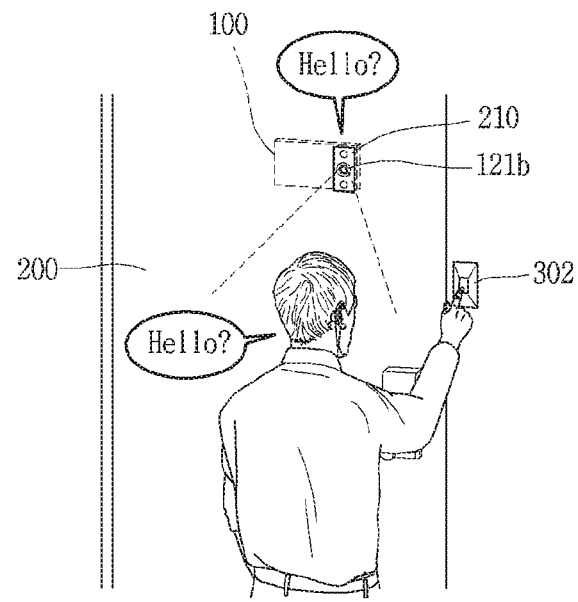
FIG. 3 is a conceptual diagram illustrating an example where a monitoring apparatus according to the present invention operates based on a result obtained by sensing situations around an object.
Figure 3:
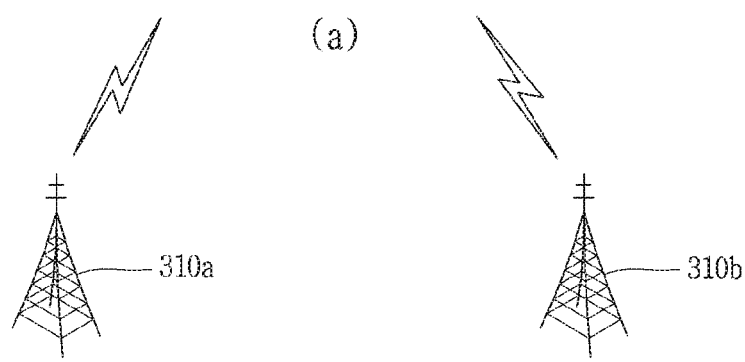
Figure 3:

FIG. 3 illustrates an example of such a case.

To provide description with reference to FIG. 3, as illustrated in FIG. 3 (a), when there is a person approaching a place around the object 200, the control unit 180 of the monitoring device 100 according to an embodiment of the present invention may sense the approach. In this case, the control unit 180 may perform a specific operation, based on a result obtained by sensing situations around the object 200.

That is, as illustrated in FIG. 3 (a), when a situation where the person approaching the place around the object 200 presses a doorbell 302 occurs, the control unit 180 may sense the situation from noise caused by the doorbell 302. In this case, the control unit 180 may transmit information about the sensed situation to the mobile terminal 300 of the user over a wireless communication network 310a. In this case, the information transmitted to the mobile terminal 300 may include an image of a rear surface of an object 200, received through the second camera 121b, and information associated with a situation where the doorbell 302 is pressed.

In this case, the mobile terminal 300 of the user may display a screen associated with the received information. That is, as illustrated in FIG. 3 (b), a display unit of the mobile terminal 300 may display an image received from the second camera 121b. In addition, the information associated with the situation where the doorbell 302 is pressed may be displayed in the form of messages by the display unit of the mobile terminal 300.

Then, as illustrated in FIG. 3 (b), the user may output voice data. In this case, a voice of the user received through a microphone of the mobile terminal 300 may be received through one of modules of the wireless communication unit 110 according to an embodiment of the present invention over the wireless communication network 310b. Also, as illustrated in FIG. 3 (a), the control unit 180 may output the received voice data of the user through the second sound output unit 152b.

In the above description of FIG. 3, an example where voice data of the user is output when a person approaches the object 200 and presses a doorbell has been described, but various functions may be performed. For example, when there is a target object located within a predetermined distance from the object 200, the control unit 180 may sense the target object and may check a time for which the target object stays in a state of approaching to within the predetermined distance from the object 200. Also, the control unit 180 may sense a knock or an impact applied to the object 200, in addition to a sound of pressing the doorbell 302. Alternatively, the control unit 180 may sense vibration which is equal to or more than a certain level and is applied to the object 200 for a certain time or more.

When situations around various objects are sensed, the control unit 180 may transmit information about the sensed situations to the mobile terminal 300 of the user. In this case, the information about the sensed situations may be stored in the mobile terminal 300 of the user and the memory 170 of the monitoring device 100, and at least one of various functions associated therewith may be performed. That is, the control unit 180 may output one or more pieces of predetermined audio data, namely, audio data associated with, for example, noise of driving a home appliance such as a cleaner and living noise such as noise such as voices of children or people. Alternatively, the control unit 180 may allow currently stored information associated with situations to be transmitted to a security office or a police station.

Hereinafter, embodiments of a control method performed by the mobile terminal will be described with reference to the accompanying drawings. It is obvious to those skilled in the art that the present invention is embodied in another specific form within departing from the spirit and essential feature of the present invention.

Figure 4:
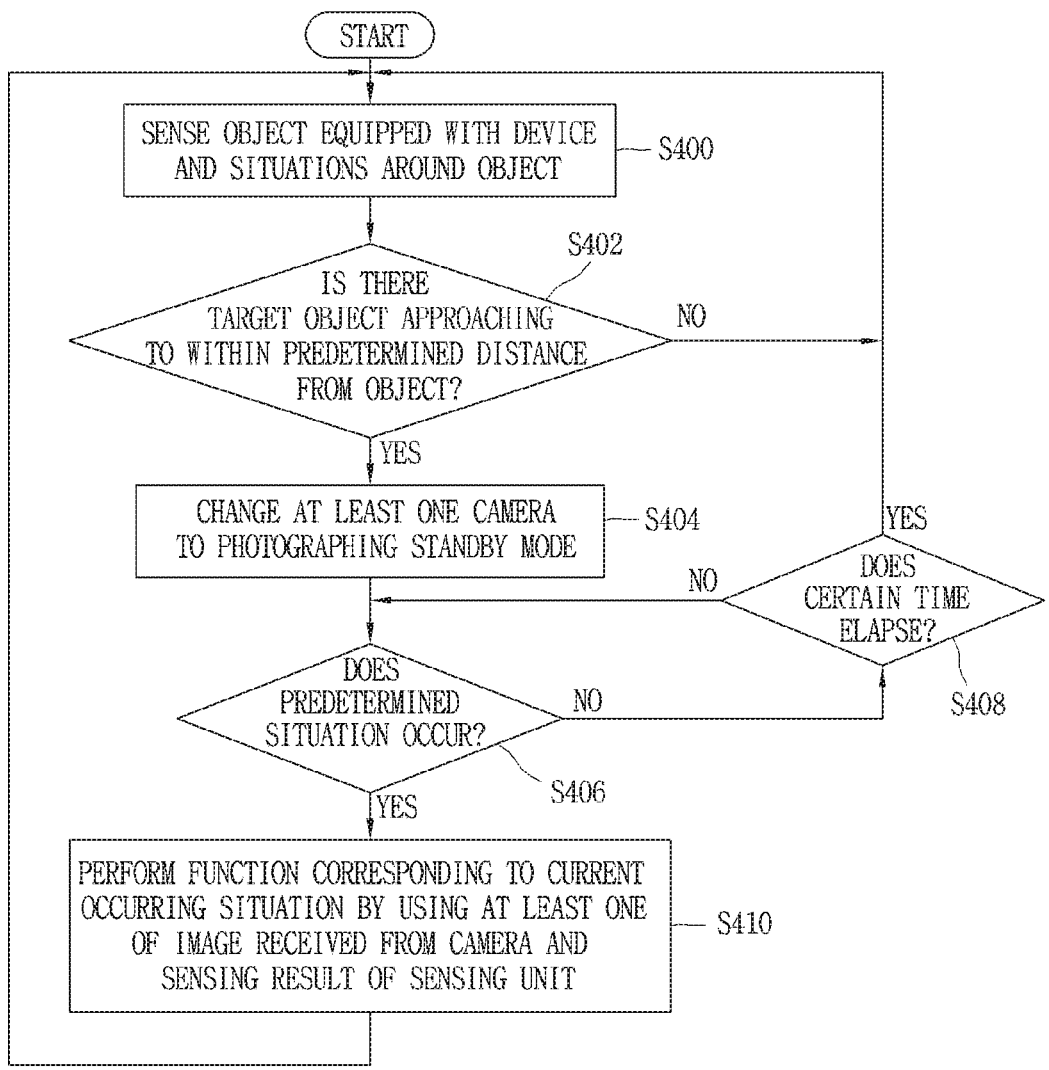
FIG. 4 is a flowchart illustrating an operation of a monitoring apparatus according to the present invention.

First, FIG. 4 illustrates an operation of a monitoring apparatus according to the present invention.

To provide description with reference to FIG. 4, the control unit 180 of the monitoring device 100 according to an embodiment of the present invention senses surrounding situations by using the sensors of the sensing unit 140. In this case, in operation S400, the sensors of the sensing unit 140 may sense situations around the monitoring device 100, namely, the object equipped with the monitoring device 100 and situations around the object. For example, a sensor such as an ultrasonic sensor, an infrared sensor, a thermal sensor, or an optical sensor among the sensors may sense a target object approaching a front surface of a rear surface of the object 200, and a sensor such as an acceleration sensor, a vibration sensor, or an inertial sensor among the sensors may sense an impact or vibration transferred to the monitoring device 100 through the object 200. The microphone 122 may sense noise occurring around the monitoring device 100, namely, in the object 200 or around the object.

In operation S402, the control unit 180 may sense whether there is a target object approaching to within a predetermined distance from the object 200, based on a result obtained through sensing by the sensing unit 140. Also, an operation mode of the monitoring device 100 may be changed according to the sensing result of operation S402. That is, based on the sensing result of operation S402, when there is the target object approaching the place within the predetermined distance from the object 200, the control unit 180 may change an operation state of at least one of the cameras 121a and 121b included in the monitoring device 100 to a photographing standby mode in operation S404.

In operation S404, the control unit 180 may change an operation mode of a camera corresponding to a direction, in which the target object is sensed, with respect to the object 200. That is, for example, when a target object is sensed in a direction toward the front surface of the object 200, the control unit 180 may change an operation mode of the first camera 121a provided on the front surface of the object 200 to the photographing standby mode, and when a target object is sensed in a direction toward the rear surface of the object 200, the control unit 180 may change an operation mode of the second camera 121b provided on the rear surface of the object 200 to the photographing standby mode.

Here, the photographing standby mode may be an operation mode of receiving an image through an image sensor of a camera and displaying the image in the display unit 151. Such a state, namely, a target object located within a predetermined distance from the front or rear surface of the object 200, may be sensed, and thus, in a state of receiving an image in a direction in which the target object is sensed from one camera 121a or 121b, the control unit 180 may determine whether a predetermined situation occurs in the object 200 in operation S406.

Here, the predetermined situation may be various situations. For example, the predetermined situation may be a situation where the target object causes noise equal to or more than a certain level. That is, when the target object presses a doorbell or causes noise of calling a person, the control unit 180 may sense the noise to determine occurrence of the predetermined situation.

Alternatively, the predetermined situation may be sensed according to various sensing results sensed through the object 200. For example, when the target object applies an impact (for example, a knock or the like) to the object, the control unit 180 may sense the impact, or when vibration which has intensity equal to or more than a certain level or is continued for a certain time or more is sensed from the object 200, the control unit 180 may determine occurrence of a specific situation, based on the sensed vibration. Alternatively, if a time for which the target object is sensed within a predetermined distance from the object 200 is equal to or more than a predetermined time, the control unit 180 may determine occurrence of a predetermined situation.

In operation S410, the control unit 180 may determine whether the predetermined situation occurs for the predetermined time. In this case, in a state where the target object approaches to within the predetermined distance from the object 200 and the predetermined situation does not occur, the control unit 180 may determine whether a certain time elapses. Also, when it is determined in operation S410 that the certain time does not elapse, the control unit 180 may proceed to operation S406 and may determine whether the predetermined situation occurs.

However, when it is determined in operation S410 that the certain time elapses, the control unit 180 may proceed to operation S400 and may monitor the object 200 and situations around the object 200. Also, the control unit 180 may repeat operations S404 and S406, based on the sensing result of operation S402.

When it is determined in operation S406 that the predetermined situation occurs, by using at least one of an image received from at least one of the cameras 121a and 121b and the sensing result of the sensing unit 140, the control unit 180 may perform a function corresponding to a current occurring situation in operation S410. For example, the control unit 180 may transmit monitoring information, including an image received from the at least one camera and/or the sensing result of the sensing unit 140, to the mobile terminal 300 of the predetermined user. For example, the control unit 180 may transmit the monitoring information in the form of push notification or may transmit the monitoring information to the mobile terminal 300 of the user in the form of call transmission. In this case, when the user connects a telephone conversation through a call received by the mobile terminal 300, the control unit 180 may provide the monitoring information to the user in the form of video call. In this case, the monitoring information may be stored in the monitoring device 100 and/or the mobile terminal 300.

In this case, the control unit 180 may perform various functions according to a control signal transmitted from the mobile terminal 300 of the user in operation S410. For example, the control unit 180 may output voice data, transmitted from the mobile terminal 300, through the first sound output unit 152a or the second sound output unit 152b. Alternatively, the control unit 180 may allow a specific function to be performed according to the control signal transmitted from the mobile terminal 300.

For example, the control unit 180 may allow pre-stored audio data to be output according to the control signal. That is, the control unit 180 may allow various pieces of audio data associated with living noise to be output through the sound output unit 152 according to the control signal, or may allow a sound of siren or an emergency alarm bell to be output. Alternatively, the control unit 180 may perform a function of reporting a current situation to a predetermined contact address, namely, a police office or a security office.

Even when there is no control signal transmitted from the mobile terminal 300 of the user, the control unit 180 may automatically perform the functions. For example, when a target object approaching to within a predetermined distance from the object is sensed for a predetermined time or more, the control unit 180 may sequentially or randomly output at least some of a plurality of pieces of predetermined audio data (for example, audio data associated with living noise), or may simultaneously and automatically output a plurality of pieces of audio data. In this case, if the audio data are a sound of children, a sound of people, and cleaning noise, at least two of the pieces of audio data may be simultaneously output based on a sensing result obtained by sensing situations around the object 200.

The control unit 180 may add images, received from all of the cameras 121a and 121b, into the monitoring information. For example, when a target object is sensed from each of the front surface and the rear surface of the object 200, the control unit 180 may transmit the monitoring information, including the images received from all of the cameras 121a and 121b, to the mobile terminal 300. In this case, the user may distinguish and check the images received from all of the cameras 121a and 121b, based on the monitoring information.

The control unit 180 may allow different functions to be performed depending on a position of the mobile terminal 300 in operation S410. For example, when the mobile terminal 300 of the user is within a certain distance from the monitoring device 100, the control unit 180 may not transmit the monitoring information to the mobile terminal 300. This is because when the user is near the object 200, the user can know the object 200 and situations around the object 200 even without using the monitoring information.

For example, when the mobile terminal 300 of the user is within the certain distance from the monitoring device 100, the control unit 180 of the mobile device 100 may perform another function in operation S140. For example, the control unit 180 may sense a state, where the user is located near the object 200, from a position of the mobile terminal 300 or may recognize (for example, recognize a face of the user) the user from an image of the user received from the first camera 121a provided on the front surface of the monitoring device 100, thereby sensing that the user is near the object 200. In this case, the control unit 180 may determine a state where the user intends to go out, and may provide various functions associated therewith.

For example, the control unit 180 may display information, associated with states of various peripheral home appliances connectable to the monitoring device 100, in the display unit 151. For example, the control unit 180 may display the presence of a state, where various home appliances such as a TV, a vacuum cleaner, a fluorescent lamp, a microwave oven, etc. are currently operating, in the display unit 151. In this case, the control unit 180 may control the displayed operating states of the home appliances, based on a user input (for example, a touch input applied to the display unit 151) for pieces of information associated with the operating states of the home appliances. That is, before going out, the user may check states of various home appliances through the display unit 151 of the monitoring device 100 according to an embodiment of the present invention and may change an operating state of a currently turned-on home appliance to an off state.

If the various functions are executed in operation S410, the control unit 180 may proceed to operation S400 and may sense the object 200 and situations around the object 200. Also, the control unit 180 may repeat operations S404 to S410 according to the sensing result of operation S402.

Figure 5:
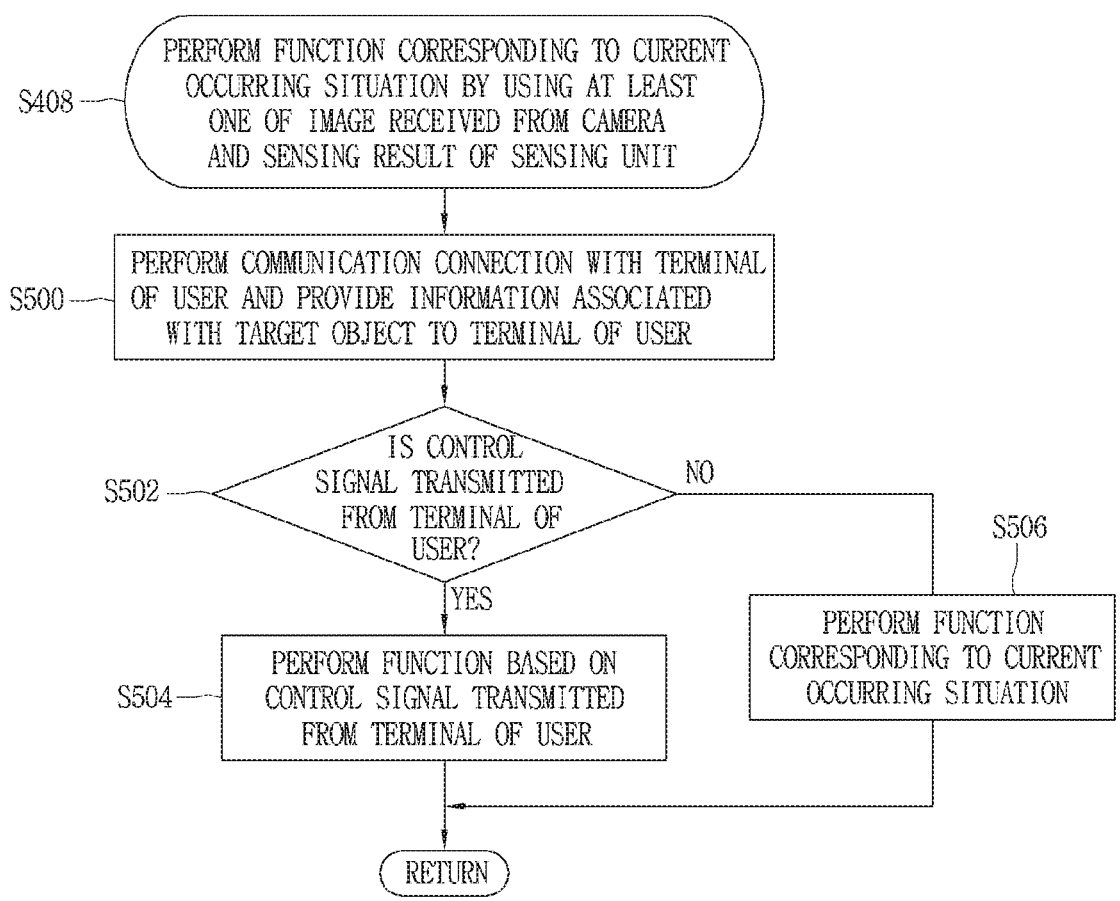
FIG. 5 is a flowchart illustrating in more detail an operation of performing a function corresponding to a current occurring situation among operations of FIG. 4.

FIG. 5 illustrates in more detail a process of performing an operation based on a control signal transmitted from the mobile terminal 300 of the user in a process performed in operation S410 among the processes of FIG. 4.

To provide description with reference to FIG. 5, when a predetermined situation occurs in operation S406, namely, when the target object is sensed for the predetermined time within the predetermined distance from the object 200 or noise, vibration, or impact equal to or more than the predetermined level is sensed, the control unit 180 may sense it.

In this case, the control unit 180 may perform a communication connection with the mobile terminal 300 of the user and may transmit monitoring information about a currently sensed situation to the mobile terminal 300 of the user in the form of call transmission or push notification in operation S500. Here, the monitoring information may include an image received from one of the first and second cameras 121a and 121b and sensing information about the sensed situation, for example, information about the presence of occurrence of an impact, vibration, or noise and a time when the impact, vibration, or noise occurs.

In this case, the mobile terminal 300 of the user may provide the user with information about the sensed situations, in addition to the image included in the monitoring information. The information about the sensed situations may be provided to the user in the form of texts, but may be provided to the user in various forms. For example, in noise, the monitoring information may include audio information obtained by recording the occurred noise, and the mobile terminal 300 of the user may output the recorded information according to a request of the user. Alternatively, in vibration or impact, the mobile terminal 300 may drive a haptic module or vibration according to the monitoring information to cause a haptic reaction or vibration corresponding to vibration or an impact included in the monitoring information.

When the monitoring information is provided to the mobile terminal 300 of the user in operation S500, the control unit 180 may sense whether there is a control signal transmitted from the mobile terminal 300 of the user in operation S502. For example, the control unit 180 may check whether the control signal is received in response to the transmitted monitoring information within a predetermined time after the monitoring information is transmitted, and may perform a specific function according to whether the control signal is received.

When it is checked in operation S502 that the control signal for executing the specific function is received from the mobile terminal 300 of the user, the control unit 180 may perform a function based on the control signal in operation S504. Here, the control signal may allow audio data stored in the memory 170 or audio data stored in a predetermined external server (for example, a cloud server) to be output through at least one of the first sound output unit 152a and the second sound output unit 152b. In this case, the control signal may be for designating at least one of the audio data stored in the memory 170 and the audio data stored in the predetermined external server.

In this case, the control unit 180 may output the at least one pieces of audio data designated by the control signal. For example, if the control signal is for designating a plurality of pieces of audio data, the control unit 180 may allow the plurality of pieces of audio data to be output simultaneously. Here, the control unit 180 may output the plurality of pieces of audio data in a stereo form by using the first sound output unit 152a and the second sound output unit 152b. Therefore, in the monitoring device 100 according to an embodiment of the present invention, various sound signals based on a combination of the plurality of pieces of audio data may be output through the sound output unit 152 according to a selection of the user.

When it is checked in operation S502 that there is no control signal which is received within the predetermined time, the control unit 180 may perform a predetermined function, based on the current object 200 and situations determined based on a result obtained by sensing a periphery of the object 200. For example, when a sound of a doorbell or a sound of knocking the object 200 is sensed based on a result obtained by sensing the object 200 and the periphery of the object 200, the control unit 180 may allow audio data recorded from the user to be output. For example, the user may record a comment "who is it?" or "please tell business", and a sound around the object 200 may be recorded through the microphone 122 included in the monitoring device 100.

For example, when a target object within the predetermined distance from the object 200 is sensed for a certain time or more, the control unit 180 may automatically perform a function corresponding thereto. For example, the control unit 180 may reproduce at least one of pieces of predetermined audio data. In this case, the control unit 180 may randomly select at least some of the pieces of predetermined audio data and may simultaneously output the selected at least one piece of audio data. Alternatively, the control unit 180 may output the at least one piece of audio data in a stereo form by using the first sound output unit 152a and the second sound output unit 152b.

The control unit 180 may perform a function (i.e., a report function) of informing a police office or a security office of a current situation, based on a result obtained by sensing the object 200 and the periphery of the object 200. For example, when vibration or noise equal to or more than a predetermined level or an impact equal to or more than a predetermined level is applied to the object 200, the control unit 180 may determine that a person intrudes illegally. In this case, the control unit 180 may inform a police office or a security office that the person intrudes illegally, and may transmit current position information (for example, an apartment address number), an image received from the first camera 121a and/or the second camera 121b, and information including the sensing result to the police office or the security office. Also, the control unit 180 may output a sound of siren or a warning sound such as an alarm at volume equal to or more than a predetermined level.

In the above description, an operation of the monitoring device 100 according to an embodiment of the present invention will be described with reference to a flowchart.

In the following description, an example where the monitoring device 100 according to an embodiment of the present invention and the mobile terminal 300 of the user operate based on a result obtained by sensing the object 200 and a periphery of the object 200 will be described in more detail with reference to an exemplary diagram.

Figure 6:
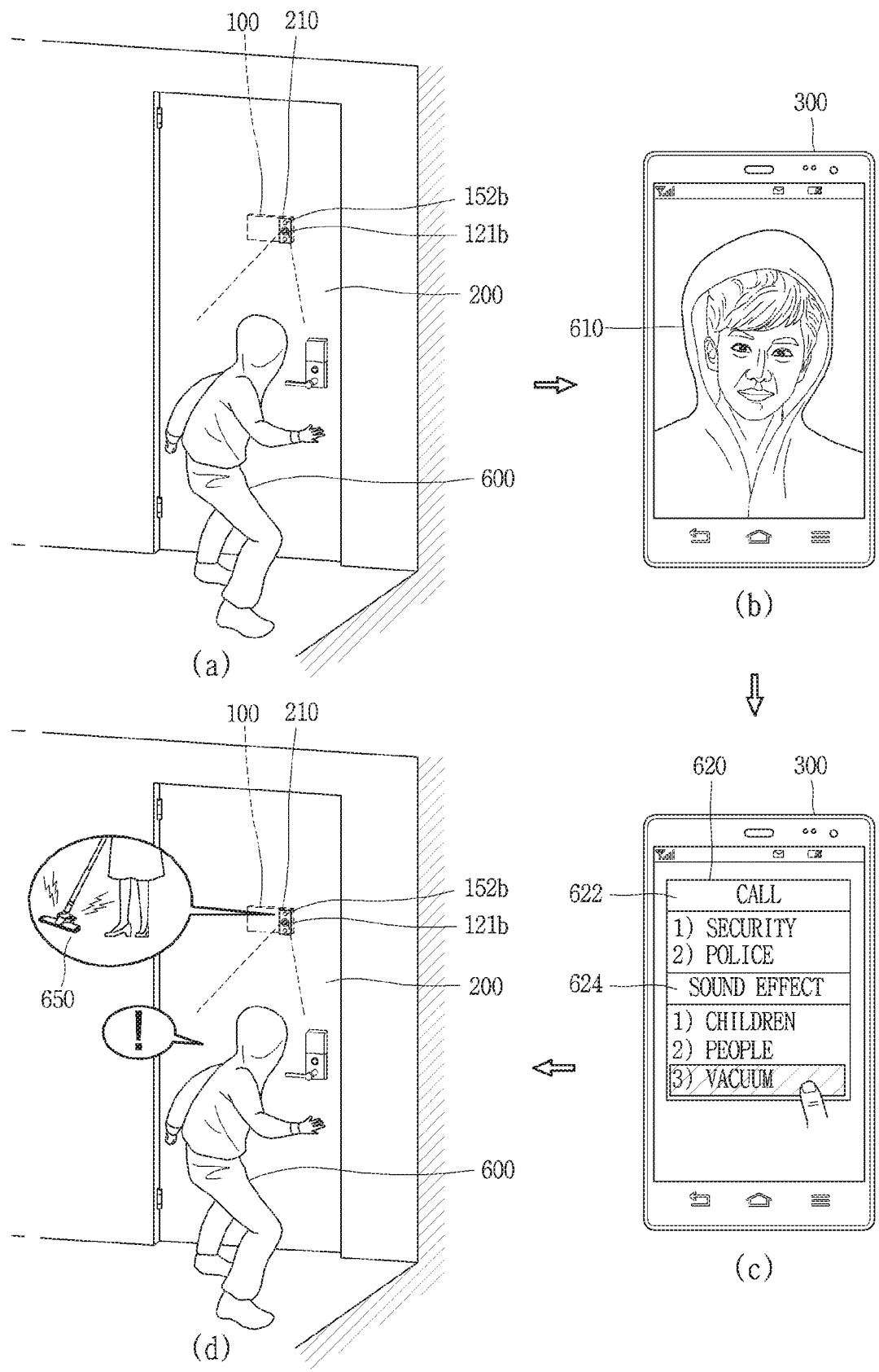
FIG. 6 is an exemplary diagram illustrating an example of performing, by a monitoring apparatus according to the present invention, a function based on a result obtained by sensing situations around an object.

First, FIG. 6 is an exemplary diagram illustrating an example of performing, by a monitoring apparatus according to the present invention, a function based on a result obtained by sensing situations around an object 200.

To provide description with reference to FIG. 6, as illustrated in FIG. 6 (a), when a target object 600 is sensed near an object 200, the control unit 180 may change an operating state of the second camera 121b to a photographing standby state. In this case, the second camera 121b may receive an image from an image sensor, and when there is control by the control unit 180, the second camera 121b may store the received image in the memory 170 or a predetermined external server (for example, a cloud server).

In this state, when a time for which the target object 600 is sensed near the object is equal to or more than a predetermined time, the control unit 180 may determine occurrence of a predetermined situation. In this case, the control unit 180 may control the second camera 121b to store the received image and may transmit monitoring information including the stored image to the mobile terminal 300 of the user. FIG. 6 (b) illustrates an example where an image 610 of the target object 600 included in the monitoring information is transmitted to the mobile terminal 300 of the user.

In this case, as seen in FIG. 6 (b), the mobile terminal 300 of the user may display a menu screen 620, displaying functions capable of being performed by the monitoring device 100 according to an embodiment of the present invention, in a display unit. For example, as displayed on the menu screen 620, the functions may be a function 622 of reporting to a security office or a police office. Alternatively, the functions may be a function of outputting various pieces of audio data such as a sound of children, a sound of people, a nose of a vacuum cleaner, a noise of a TV, etc.

In a state where the menu screen 620 is displayed, a control unit of the mobile terminal 300 may receive at least function selected by the user. For example, as seen in FIG. 6 (c), when the user selects "noise of vacuum cleaner", the control unit of the mobile terminal 300 may transmit a control signal for outputting audio data, selected by the user, to the monitoring device 100. In this case, the control unit 180 of the monitoring device 100 may output specific audio data (i.e., "noise 650 of vacuum cleaner") through the sound output unit 152 according to the control signal received from the mobile terminal 300. In this case, "noise of vacuum cleaner" may be alternately output through the first sound output unit 152a and the second sound output unit 152b to cause a stereo effect, and thus, the target object 600 may be seen like a person being a house. FIG. 6 (d) illustrates such an example.

According to the above description, the monitoring device 100 according to an embodiment of the present invention may transmit images received from all of the first and second cameras 121a and 121b and a result obtained by sensing all of a front surface and a rear surface of the object 200 to the mobile terminal 300 of the user as monitoring information. In this case, the user may distinguish and check the sensing result and the images received from the first and second cameras 121a and 121b and may allow a function corresponding thereto to be performed in the monitoring device 100.

Figure 7:
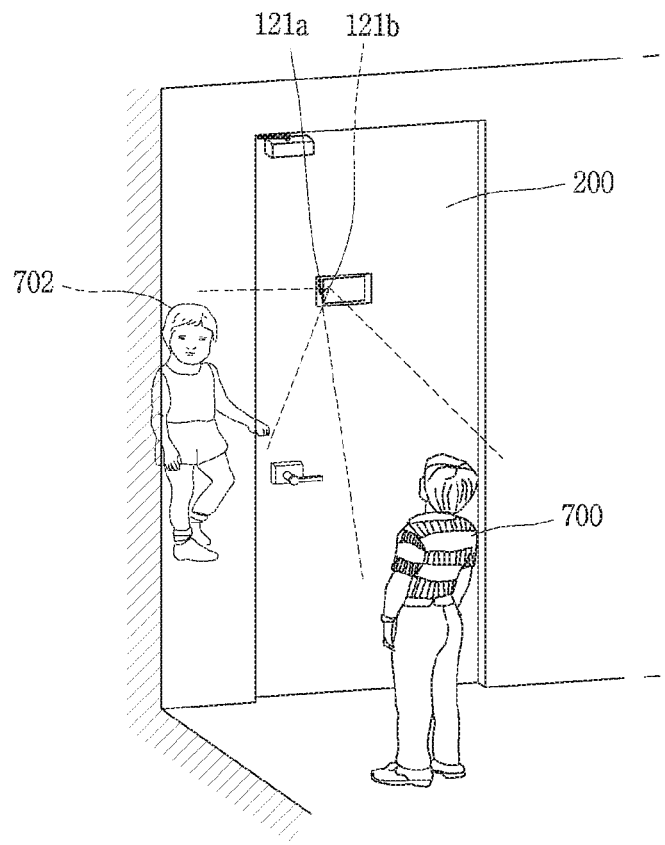
FIG. 7 is an exemplary diagram illustrating another example of performing, by a monitoring apparatus according to the present invention, a function based on a result obtained by sensing situations around an object.
Figure 7:
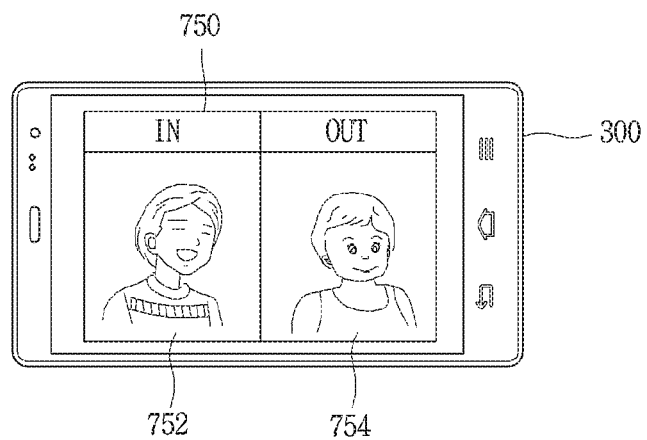

FIG. 7 illustrates an example of such a case.

To provide description with reference to FIG. 7, the monitoring device 100 according to an embodiment of the present invention may sense all of situations around the front surface and the rear surface of the object 200. Therefore, as seen in FIG. 7 (a), when there are target objects 700 and 702 approaching to within a predetermined distance from the front surface and the rear surface of the object 200, the control unit 180 may change the first camera 121a and the second camera 121b to the photographing standby mode. Also, when a predetermined situation (for example, a situation where vibration, noise, or an impact is sensed or the target objects stay near the object 200 for a predetermined time or more occurs in the object 200, the control unit 180 may photograph situations sensed from the object 200 and the images received from the first camera 121a and the second camera 121b.

In this case, the first camera 121a receiving an image corresponding to a direction toward the front surface of the object 200 may capture an image of a first target 700, and the second camera 121b receiving an image corresponding to a direction toward the rear surface of the object 200 may capture an image of a second target 702. Also, the images captured by the first camera 121a and the second camera 121b may be transmitted to the mobile terminal 300 of the user. In this case, as seen in FIG. 7 (b), the images captured by the first camera 121a and the second camera 121b may be output through the mobile terminal 300 of the user, and sound information sensed by the monitoring apparatus may be output together.

In this case, the user may allow a voice of the user to be output to the front surface and the rear surface of the object through the mobile terminal 300 of the user and the monitoring device 100. For example, in a case where a child of the user goes out, the user may check the case, based on a sensing result of the monitoring device 100. Alternatively, the child (the first target object 700) may request, through the monitoring device 100, permission from a parent (i.e., the user) as to going out and may get the permission of the user through the monitoring device 100. In this case, the user may check and store a time when the child of the user goes out and information about another person (the second target object 702), who have gone out together with the child (the first target object 700) of the user, through the second camera 121b of the monitoring device 100 receiving an image corresponding to a direction toward the rear surface of the object 200.

According to the above description, it has been described above that when there is another device connectable to the monitoring device 100, the monitoring device 100 according to an embodiment of the present invention may provide monitoring information further including information collected from the other device.

Figure 8:
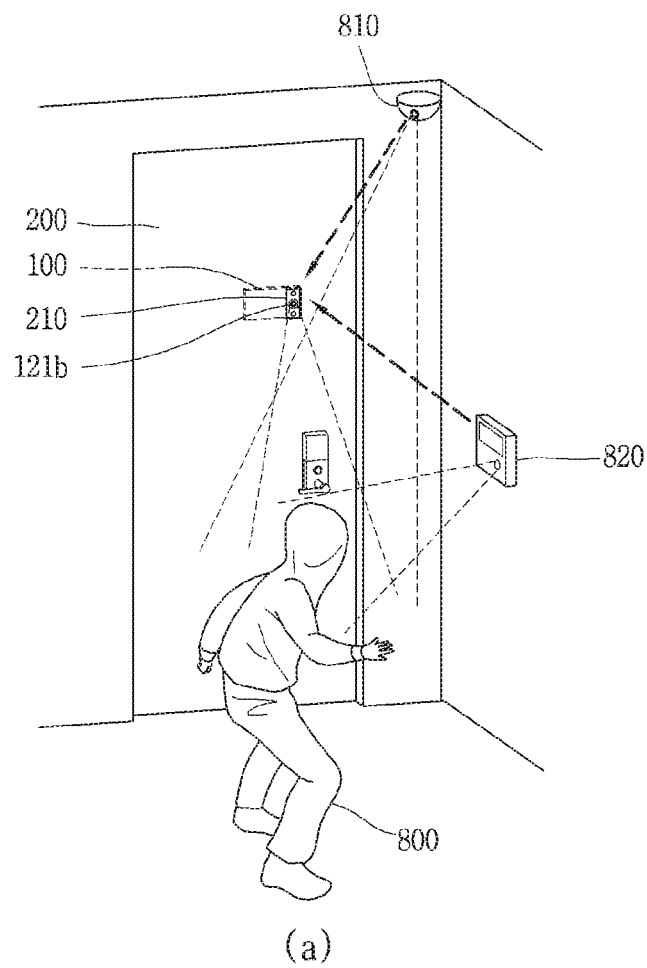
FIG. 8 is an exemplary diagram illustrating an example of providing, by a monitoring apparatus according to the present invention, information collected from the monitoring apparatus and other peripheral monitoring devices.
Figure 8:
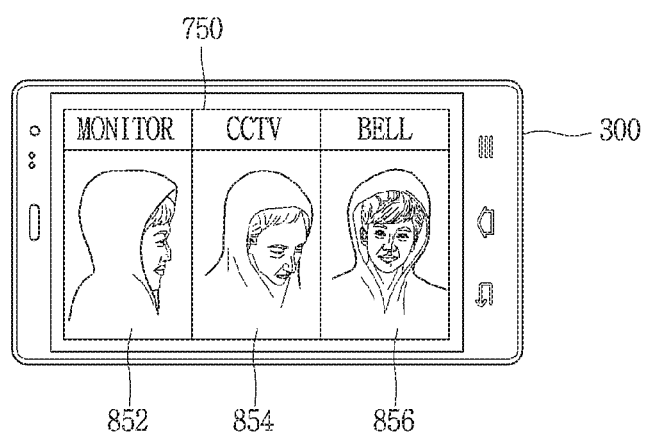

FIG. 8 is an exemplary diagram illustrating an example of providing, by a monitoring apparatus according to the present invention, a user with monitoring information further including information collected from the monitoring apparatus and other peripheral monitoring devices.

When there is at least one other monitoring apparatus, the control unit 180 of the monitoring device 100 according to an embodiment of the present invention may collect signals sensed from the at least one other monitoring apparatus, based on a result obtained by sensing the object 200 and a periphery of the object 200. Also, the control unit 180 may transmit monitoring information further including the collected information.

For example, as seen in FIG. 8 (a), when there is another monitoring apparatus such as a CCTV 810 and a camera included in a doorbell 820 near the monitoring device 100 according to an embodiment of the present invention, the control unit 180 may collect information sensed by the other monitoring apparatus. That is, as see in FIG. 8 (a), in a state where a target object 800 is sensed near an object 200, when a predetermined situation (for example, a situation where vibration, noise, or an impact is sensed or the target object 800 stays near the object 200 for a predetermined time or more occurs in the object 200, the control unit 180 may store an image of the object 800 by using the second camera 121b receiving an image corresponding to a direction in which the target object 900 is sensed, namely, a direction toward a rear surface of the object.

In this case, the control unit 180 may simultaneously collect pieces of information received from other monitoring devices near the monitoring device 100, namely, the CCTV 810 and the doorbell 810. In this case, the control unit 180 may generate monitoring information further including pieces of information collected from the other monitoring devices 810 and 820, and the generated monitoring information may be transferred to the mobile terminal 300 of the user.

Therefore, as seen in FIG. 8 (b), images obtained by photographing the target object 800 at various angles may be provided to the mobile terminal 300 of the user. In this case, the control unit of the mobile terminal 300 may distinguish and display an image 852 captured by the second camera 121b and images 854 and 856 captured by the other monitoring devices 810 and 820 according to a selection of the user. Also, the images captured by the second camera 121b and the other monitoring devices 810 and 820 may be provided to a police office or a security office according to a selection of the user.

In FIG. 8, an example where monitoring information provided to the mobile terminal 300 of the user includes information collected from other monitoring devices located on a rear surface of the object 200 is merely illustrated. On the other hand, when there are other monitoring devices located on a front surface of the object 200, the monitoring information may further include pieces of information collected from the devices. In this case, the monitoring apparatus 300 which has received the monitoring information may distinguish and display images, captured from the front surface of the object (i.e., monitoring devices monitoring indoor situations) and the rear surface of the object (i.e., monitoring devices monitoring outdoor situations), in a display unit.

Moreover, in the above description, an example where the monitoring device 100 according to an embodiment of the present invention is equipped in the object 200 has been described. However, this is merely an embodiment of the present invention, and the present invention is not limited thereto. That is, unlike the illustration of FIGS. 2A and 2B, the monitoring device 100 may be mounted on the rear surface of the object 200, and in this case, a portion where the display unit 151 of the monitoring device 100 is identifiably mounted may be the rear surface instead of the front surface of the object 200.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the control unit 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A monitoring apparatus comprising:
a device body mounted on one surface of an object including a front surface and a rear surface;
at least two cameras included in the device body, the at least two cameras receiving an image corresponding to a direction toward the front surface of the object and an image corresponding to a direction toward the rear surface of the object;
a sensing unit including at least one sensor for sensing the object and a situation around the object; and
a control unit operably coupled with the at least two cameras and the sensing unit and configured to:
control at least one of the at least two cameras, which receives an image in a direction in which at least one target object is located, such that the at least one camera is in a photographing standby mode when the at least one target object is detected within a predetermined distance from the front or rear surface of the object;
perform a function corresponding to a current situation by using at least one of an image received from the at least one camera and the current situation sensed by the sensing unit; and
perform a different function based on whether the at least one target object is within the predetermined distance from the front surface or the rear surface of the object or a plurality of different target objects are within the predetermined distance from the front surface and the rear surface of the object.

2. The monitoring apparatus of claim 1, wherein the control unit transmits the at least one of the images received from the at least one camera and the current situation sensed by the sensing unit to a predetermined terminal and performs a function based on a control signal transmitted from the predetermined terminal.

3. The monitoring apparatus of claim 2, wherein the function based on the control signal is a function of outputting at least one of a plurality of pieces of audio data stored in the monitoring apparatus based on the control signal.

4. The monitoring apparatus of claim 3, wherein the control unit selects at least some of the stored plurality of pieces of audio data according to the control signal and simultaneously outputs the selected at least some pieces of audio data.

5. The monitoring apparatus of claim 3, wherein the control unit outputs the at least one piece of audio data in a stereo form by using a plurality of sound output units included in the monitoring apparatus.

6. The monitoring apparatus of claim 2, wherein:
the predetermined terminal receives a voice signal of a user, and
the control signal is a signal for controlling the monitoring apparatus to output the voice signal of the user input through the predetermined terminal.

7. The monitoring apparatus of claim 2, wherein when target objects are detected within the predetermined distance from all of the front surface and the rear surface of the object, the control unit transmits images, sensed by all of the at least two cameras, to the predetermined terminal.

8. The monitoring apparatus of claim 2, wherein the control unit is further configured to:
detect at least one other monitoring apparatus different from the monitoring apparatus; and
collect information sensed from the at least one other monitoring apparatus and transmits the collected information to the predetermined terminal when the predetermined situation is sensed by the sensing unit.

9. The monitoring apparatus of claim 2, wherein the image received from the at least one camera and the current situation sensed by the sensing unit are transmitted to the predetermined terminal, and then, when the control signal is not received from the predetermined terminal within a predetermined time, the control unit automatically performs the function corresponding to the current situation.

10. The monitoring apparatus of claim 9, wherein the automatically performed function is a function of outputting at least one of pieces of stored audio data or a function of transmitting information including the image received from the at least one camera and the sensed predetermined situation, based on a predetermined contact address.

11. The monitoring apparatus of claim 2, wherein:
the control unit recognizes whether a user goes out, based on a position of the predetermined terminal, and
when it is recognized that the user goes out, the control unit causes a display unit of the monitoring apparatus to display information about a state of at least one connectable home appliance.

12. The monitoring apparatus of claim 11, wherein the control unit controls a power state of the at least one home appliance of which the state is displayed in the display unit, based on a user input applied to the display unit.

13. The monitoring apparatus of claim 1, wherein when at least one of noise, vibration, or an impact equal to or more than a predetermined level is sensed from the object or near the object, the control unit determines occurrence of the predetermined situation.

14. The monitoring apparatus of claim 13, wherein the control unit transmits information, associated with the sensed at least one of the noise, the impact, or the vibration, to predetermined at least one other terminal along with the image received from the at least one camera.

15. The monitoring apparatus of claim 14, wherein when the information received from the monitoring apparatus includes the information associated with the sensed at least one of the noise, the impact, or the vibration, the at least one other terminal outputs at least one of a sound signal or vibration corresponding to the at least one of the noise, the impact, or the vibration along with the image received from the at least one camera.

16. The monitoring apparatus of claim 1, wherein when the at least one target object is sensed within the predetermined distance from the object for a predetermined time or more, the control unit determines occurrence of the predetermined situation.

17. The monitoring apparatus of claim 1, further comprising a display unit identifiably mounted on one of the front surface and the rear surface of the object,
wherein the control unit receives an image, corresponding to a direction toward a surface opposite to a surface of the object on which the monitoring apparatus is mounted, and causes the display unit to display the received image.

18. The monitoring apparatus of claim 1, wherein:
a first function is performed when the at least one target object is within the predetermined distance from the front surface or the rear surface of the object; and
a second function different from the first function is performed when the plurality of different target objects are within the predetermined distance from the front surface and the rear surface of the object.

19. The monitoring apparatus of claim 1, wherein the monitoring apparatus is one of a personal digital assistant (PDA), a portable multimedia player (PMP), a navigation device, and a tablet personal computer (PC).

20. A method of controlling a monitoring apparatus, which is mounted on a front surface or a rear surface of an object and senses the object and a situation around the object, the method comprising:

sensing a target object located within a predetermined distance from at least one of the front surface or the rear surface of the object;

controlling at least one of at least two cameras, corresponding to a direction toward the front surface or the rear surface of the object, such that the at least one camera is in a photographing standby mode, in response to the sensed target object;

switching the at least one camera from the photographing standby mode to a photographing activation mode when a predetermined situation is sensed such that at least one image received from the at least one camera is stored;

performing a function corresponding to a current situation by using at least one of an image received from the at least one camera and the current situation around the object, wherein the predetermined situation is a situation where noise equal to or more than a predetermined level occurs, a situation where an impact or vibration which is sensed from the object and is equal to or more than a predetermined level occurs, or a situation where the target object is sensed within the predetermined distance from the object for a predetermined time or more; and performing a first function when one target object is within the predetermined distance from the front surface or the rear surf ace of the object and performing a second function different from the first function when a plurality of different target objects are within the predetermined distance from the front surf ace and the rear surf ace of the object.

\* \* \* \* \*